Figure 1:
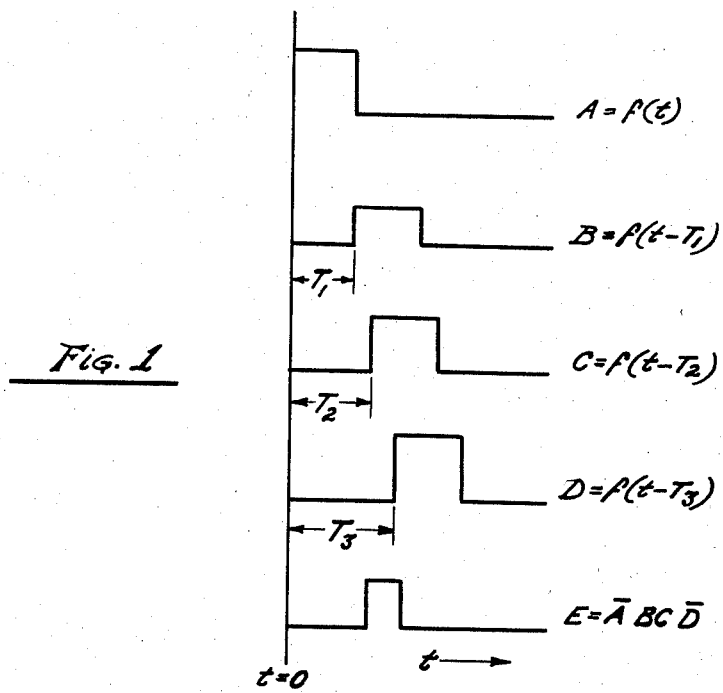

July 1, 1958     F. W. MARSCHALL     2,841,710
METHOD AND MEANS FOR PULSE WIDTH DISCRIMINATION
Filed July 17, 1956

INVENTOR.
FREDERICK W. MARSCHALL

United States Patent Office 2,841,710
Patented July 1, 1958

2,841,710

METHOD AND MEANS FOR PULSE WIDTH DISCRIMINATION

Frederick W. Marschall, Rome, N. Y., assignor to the United States of America as represented by the Secretary of the Air Force Application July 17, 1956, Serial No. 598,485

6 Claims. (Cl. 250—27)

(Granted under Title 35, U. S. Code (1952), sec. 266)

The invention described herein may be manufactured and used by or for the United States Government for governmental purposes without payment to me of any royalty thereon.

This invention relates generally to signal selective circuits and more particularly to an unique self-gating technique which permits precise limitation of minimum and maximum signal duration that will produce an output.

The invention is applicable to signals in the millimicrosecond region wherein consecutive pulses may be discriminated whose relationship in time is only slightly greater than the designed maximum pulse width. The invention has utility wherever pulse width discrimination is utilized, for example, it may be incorporated into secondary radar systems as an anti-jam feature.

It is an object of this invention to present a self-gating technique which enables a waveform to gate itself with a heretofore unattainable precision.

It is also an object of the invention to provide electronic circuits for eliminating undesired signals.

Another object of the invention is the reduction of the time shift associated with an output waveform for variations in width of the input waveform.

A further object of the invention is the provision of a technique which utilizes the lower frequency components of the waveform to reduce the effects of stray capacitance, inductance and other inherent deficiencies of existing equipment.

A still further object of the invention is the provision of a network for pulse width discrimination which requires fewer components, both active and passive, thereby creating an extremely stable unit which is considerably reduced in size, complexity, cost, and power dissipation, as compared with what has hitherto been achieved.

Another object of the invention involves the production of a pulse width discriminator device wherein a greater percentage of the input signal amplitude is available as output than has been obtained with prior devices.

A further object of the invention is the provision of a circuit design that is relatively insensitive to the rise and decay time of the input signal.

A still further object of the invention is the provision of a device which does not interfere with the regularity of the input signal.

Another object of the invention involves the presentation of a device which is extremely accurate due to the use of precision passive elements to generate time intervals.

A further object of the invention is the presentation of a method which permits design of circuitry capable of precisely limiting the minimum and maximum signal widths capable of producing an output.

Figure 2:
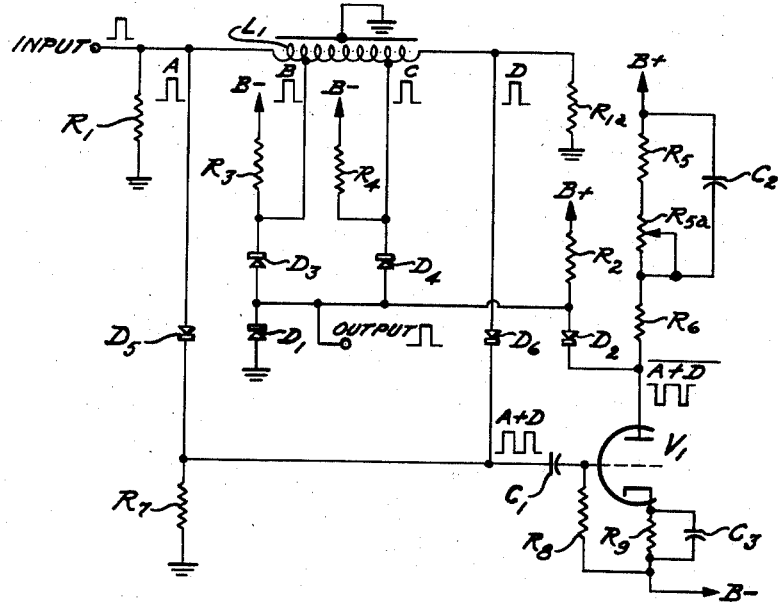

These and other advantages, features and objects of the invention will become more apparent from the following description taken in connection with the illustrative embodiment in the accompanying drawings, wherein:

Figure 1 illustrates a series of pulses representative of the logic of the self-gating technique to accomplish pulse width discrimination; and Figure 2 is a schematic diagram of circuitry utilizing the self-gating technique of the invention for pulse-width discrimination.

The logic and method of the unique self-gating technique of my invention can best be explained with reference to Figure 1. The input pulse $A=f(t)$ is delayed by times $T_1$, $T_2$ and $T_3$, as shown in the figure, to produce pulses $B=f(t-T_1)$, $C=f(t-T_2)$ and $D=f(t-T_3)$, respectively. By combining pulses A, B, C and D logically in Boolean expression, $E=\overline{A}BC\overline{D}$, an output E is obtained only when the width of the input pulse falls within limits determined by the delays $T_1$, $T_2$, and $T_3$. If a pulse has a width T, the logic will yield an output only in the region $T_2-T_1<T<T_3$.

Implementation was found to be more convenient when the logical expression $E=\overline{A}BC\overline{D}$ was manipulated into the form $E=BC\overline{(A+D)}$ by application of De Morgan's theorem (the product of the NOTS is equal to the NOT of the sum) to the A and D terms.

The technique or method above-described may be incorporated in a number of circuits utilizing either positive or negative signals. The circuit of Figure 2, arbitrarily designed for positive signals, receives a signal, A, at its input terminal and presents it to an electromagnetic delay line $L_1$. Delayed signals are picked off from $L_1$ at B, C and D which conform generally to the curves B, C and D of Figure 1. Diodes $D_5$ and $D_6$ provide paths for the A and D signals to produce the $A+D$ function which is coupled by means of capacitor $C_1$ to the grid of tube $V_1$ whose function is to invert the $A+D$ signal; thereby generating $\overline{A+D}$. The inverted signal $\overline{A+D}$ from $V_1$ and the B and C signals are presented to a triple "and" gate comprising diodes $D_2$, $D_3$ and $D_4$, pull down resistors $R_3$ and $R_4$, pull up resistor $R_2$, and clamping diode $D_1$ to provide an output which is represented by the curve E of Figure 1. Resistors $R_1$ and $R_{1a}$ in the circuit diagram act as an input resistor and a terminating resistor, respectively, for the delay line while $R_7$ functions to discharge stray capacitance. Tube $V_1$ contains as a part of its circuitry components $R_5$, $R_{5a}$, $R_6$, $R_8$ and $R_9$ whose functions are voltage dropping resistor, voltage-dropping resistor, plate resistor, grid resistor and cathode bias resistor, respectively. Capacitors $C_2$ and $C_3$ are provided to by-pass unwanted frequencies.

It can be seen that the circuitry of Figure 2 accomplishes the function of pulse width discrimination by viewing the operation of the circuitry of Figure 2 with signals equal to, larger, and smaller than the width of signal to be discriminated.

Firstly, with an input signal A equal to the width of the pulse to be discriminated applied to the input as shown in Figure 2, and thence to delay line $L_1$, the signals B, C and D are tapped off in accordance with the representations of Figure 1. The A and D signals are applied to the grid $V_1$ where the circuit is so designed and the supply voltages so chosen that the potential of the grid is maintained below cut-off. The output potential developed across the load resistor of tube $V_1$ is negative relative to the input signal such that the $A+D$ signal becomes $\overline{A+D}$. The output line of the pulse width discriminator has a relatively positive potential due to the connections of resistor $R_2$ while the input lines for signals B and C are relatively negative because of the connections of resistors $R_3$ and $R_4$; therefore, with no signal application, no output will appear since the voltage drop from the positive supply will appear across $R_2$ and not the diodes. In order for an output to appear, the inputs $\overline{A+D}$, B and C of the triple "and" circuit must be relatively positive at the same time. The width of the pulse to be discriminated, T, must be greater than $T_2-T_1$ and less than $T_3$ in order for all the diodes of the triple "and" circuit to be non-conducting simultaneously, thereby producing an output.

The second condition, with a pulse of greater width than that to be discriminated, would not produce an output because the delay line $L_1$ does not allow the inputs of the triple "and" circuit to go positive simultaneously; therefore, at least one of the diodes of this circuit will be conducting and the entire voltage drop will appear across $R_2$.

The third condition, where the pulse is of less duration than that which is desired, would produce an operation of the circuitry in the same manner as a pulse of too great a duration.

Although the invention has been described with reference to a particular embodiment, it will be understood to those skilled in the art that the invention is capable of a variety of alternative embodiments within the spirit and scope of the appended claims.

I claim:

1. A receiving system for recognizing a signal pulse of predetermined time duration having maximum and minimum limits, comprising an input channel for receiving an input signal pulse, means for deriving from said input signal a series of delayed signals, each time-spaced from the others by predetermined amounts, means for combining said input signal and one of said delayed signals, means for inverting said combined signal, and output means responsive to the output signal from said inverting means and the other of said delayed signals for providing a signal when said input pulse is of said predetermined time duration.

2. A system as defined in claim 1 wherein said output means includes a triple "and" gate.

3. A system as defined in claim 1 wherein said deriving means delays the input signals by times which may be designated as $T_1$, $T_2$ and $T_3$ such that the duration, T, of the pulse to be recognized falls within the limits $T_2-T_1<T<T_3$.

4. A pulse width discriminator comprising an input channel, time delay means for receiving a signal from said input channel and delaying said signal by predetermined amounts, an inverter circuit adapted to receive said input signal and one of the resulting delayed signals, and means responsive to the output of said inverter circuit and the remaining delayed signals for producing an output only when a pulse of predetermined width in said input signal is presented.

5. A device as defined in claim 4 wherein said last-mentioned means comprises a triple "and" gate.

6. A device as defined in claim 4 wherein said time delay means delays said input signal predetermined amounts which may be designated $T_1$, $T_2$, and $T_3$ such that the width, T, of a pulse to be discriminated falls within the limits $T_2-T_1<T<T_3$.

References Cited in the file of this patent

UNITED STATES PATENTS

| | | |
|---|---|---|
| 2,403,561 | Smith | July 9, 1946 |
| 2,579,473 | Chatterjea | Dec. 25, 1951 |
| 2,617,883 | Anger | Nov. 11, 1952 |
| 2,706,810 | Jacobsen | Apr. 19, 1955 |
| 2,765,115 | Beloungie | Oct. 2, 1956 |